UNITED STATES PATENT OFFICE.

CONRAD SEMPER, OF PHILADELPHIA, PENNSYLVANIA, ASSIGNOR TO HARRISON, BROTHERS & CO., OF SAME PLACE.

SIZING MATERIAL FOR PAPER-MAKERS' USE.

SPECIFICATION forming part of Letters Patent No. 351,210, dated October 19, 1886.

Application filed July 22, 1885. Serial No. 172,287. (No specimens.)

*To all whom it may concern:*

Be it known that I, CONRAD SEMPER, of the city and county of Philadelphia, and the State of Pennsylvania, have invented a new and useful Improvement in the Manufacture of a Sizing Compound for Paper - Makers' Use, of which the following is a specification.

The object of my invention is to produce a cellular or porous aluminous compound for paper-makers' use, consisting, chiefly, of sulphate of magnesia and sulphate of alumina and water, or of sulphate of zinc and sulphate of alumina and water, or of a mixture of these materials, and which will not appreciably affect such colors or pigments as are used in paper-making—as, for example, ultramarine-blue.

The following description of my invention will enable those skilled in the art to which it appertains to practice the same.

Any natural or artificial aluminous material free from iron—such as kaolin or precipitated hydrate of alumina—is treated in the usual manner with sulphuric acid to obtain a solution of sulphate of alumina. Insoluble matter suspended in said solution may be removed in the ordinary way, or it may be left in the solution until the treatment hereinafter described has been performed. The solution of sulphate of alumina is treated with oxide of zinc, oxide of magnesium, the carbonates or bicarbonates of these metals, or with a mixture of two or more of said materials, to render the solution neutral or basic, so that the aluminous compound finally obtained will not have a destructive effect upon colors or pigments generally used in paper-making—such, for instance, as artificial ultramarine-blue. These substances may be used in a powdered condition, or stirred up in water, and the aluminous solution treated may be hot or cold. In some cases two pounds of neutralizing material to one hundred pounds of finished product will suffice; in other cases, especially if the solution contains free acid, the use of more neutralizing material will be necessary. Should the solution at this stage of the process contain any insoluble impurities, they may be removed by any of the well-known means—such, for instance, as subsidence or filtration. In some cases I should prefer to add the neutralizing material to a cleared solution—as, for instance, when oxide of zinc is employed; in others I should prefer to add the neutralizing material before the impurities have been removed—as, for instance, in cases where natural carbonate of magnesia is employed, as carbonate of magnesia contains a larger or smaller quantity of silicates and other insoluble matter, and would, therefore, if added to the cleared solution, make it milky and require the clearing process to be repeated. This now basic solution of sulphate of magnesium and sulphate of alumina, or of sulphate of zinc and sulphate of alumina, is placed in suitable vessels, and is therein evaporated to a density which will cause the mass when cold to become hard. I prefer to concentrate the solution until it has reached a density of 60° to 65° Baumé, (more or less.) After this concentration has been reached the fire is withdrawn and the mass is left to cool. When it has reached a point of temperature at which it becomes pasty or semi-fluid, a small quantity of bicarbonate of soda is rapidly stirred in. The carbonic-acid gas which is disengaged by the action of the heat and by chemical action permeates the mass, and is retained therein by reason of the pasty condition of the partially-congealed compound, rendering said compound porous or vesicular. At this stage of the process the mass is emptied into suitable receptacles to quickly harden. It may, after it has been broken into pieces or fragments of the required size, be packed into barrels ready for the market.

I am aware that Henry Pemberton, of Allegheny City, Pennsylvania, has been granted Letters Patent, No. 82,747, for a process of producing a porous sulphate of alumina.

I am also aware that R. A. Fisher, of Philadelphia, has been granted Patent No. 223,442 for a process of making aluminous cake free from iron containing zinc.

Letters Patent No. 280,088 have been granted to me for a process of producing neutral sulphate of alumina containing magnesia by treating a hot solution of sulphate of alumina with carbonate or bicarbonate of magnesia; also Letters Patent No. 280,089 have been granted to me for a method of producing a neutral or basic alumino-magnesian compound.

The invention herein described and claimed provides a process whereby a neutral porous sizing material for paper-makers' use can be cheaply and quickly made. I do not confine myself to the use of bicarbonate of soda, as any other material or agent which will produce a porous condition of the mass may be employed.

Having thus described my invention, I claim—

1. The process described of manufacturing a neutral or basic porous material for paper-makers' use, and consisting, essentially, of sulphate of alumina and sulphate of zinc, or sulphate of alumina and sulphate of magnesia, substantially as set forth.

2. The process described of manufacturing from any aluminous material free from iron a neutral or basic porous sizing material for paper-makers' use, and consisting, essentially, of sulphate of alumina and sulphate of zinc, or of sulphate of alumina and sulphate of magnesia, substantially as set forth.

3. The process of manufacturing from any suitable aluminous material free from iron a neutral or basic porous sizing material for paper-makers' use, which process consists, essentially, in treating a solution of sulphate of alumina free from iron, either before or after the removal from said solution of any insoluble matter which may be contained therein, with oxide of zinc, or other suitable neutralizing material, and then adding to said solution in a sufficiently-concentrated condition, and after it has become sufficiently cool, bicarbonate of soda, substantially as set forth.

In testimony whereof I have hereunto signed my name this 17th day of July, A. D. 1885.

CONRAD SEMPER.

In presence of—
WM. C. STRAWBRIDGE,
J. BONSALL TAYLOR.